(12) United States Patent
Mori (10) Patent No.: US 8,749,921 B2
(45) Date of Patent: Jun. 10, 2014

(54) INFORMATION RECORDING SYSTEM AND MAGAZINE

(71) Applicant: Fujifilm Corporation, Tokyo (JP)

(72) Inventor: Yasuhiro Mori, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/947,101

(22) Filed: Jul. 22, 2013

(65) Prior Publication Data

US 2013/0301159 A1    Nov. 14, 2013

Related U.S. Application Data

(63) Continuation of application No. PCT/JP2012/051558, filed on Jan. 25, 2012.

(30) Foreign Application Priority Data

Feb. 17, 2011   (JP) ................................. 2011-032184

(51) Int. Cl.
  *G11B 5/41*   (2006.01)
(52) U.S. Cl.
  USPC ......................................................... 360/128
(58) Field of Classification Search
  CPC ................................ G11B 23/049; G11B 5/41
  USPC ................................................ 360/96.1, 128
  See application file for complete search history.

(56) References Cited

U.S. PATENT DOCUMENTS

| | | | | |
|---|---|---|---|---|
| 3,881,195 A | * | 4/1975 | Ono et al. | 360/128 |
| 5,930,089 A | * | 7/1999 | Anderson | 360/128 |
| 6,252,739 B1 | * | 6/2001 | Todd et al. | 360/128 |
| 6,333,831 B1 | * | 12/2001 | Todd | 360/128 |

FOREIGN PATENT DOCUMENTS

JP           6-195650 A     7/1994

OTHER PUBLICATIONS

Written Opinion of the ISA issued in International Application No. PCT/JP2012/051558 on Apr. 17, 2012.
International Search Report issued in International Application No. PCT/JP2012/051558 on Apr. 17, 2012.

* cited by examiner

*Primary Examiner* — Angel Castro
(74) *Attorney, Agent, or Firm* — SOLARIS Intellectual Property Group, PLLC (57) ABSTRACT

An information recording system includes a case, a head provided inside the case, a recording tape that travels inside the case due to rotation of a pair of reels that are provided inside the case, with at least one of information writing or information reading performed to or from the recording tape by the head while the recording tape is in contact with the head, a drive mechanism that drives the head between an in-use position contacting the recording tape and a cleaning position separated from the in-use position, and a cleaning device that is provided inside the case, and that cleans the head when positioned in the cleaning position by rubbing against the head in a direction different from a direction of movement of the head from the in-use position to the cleaning position.

8 Claims, 11 Drawing Sheets

INFORMATION RECORDING SYSTEM AND MAGAZINE

CROSS-REFERENCE TO RELATED APPLICATIONS

This application is a continuation application of International Application No. PCT/JP/2012/051558, filed on Jan. 25, 2012, the disclosure of which is incorporated herein by reference in its entirety. Further, this application claims priority over Japanese Patent Application No. 2011-032184, filed on Feb. 17, 2011, the disclosure of which is incorporated herein by reference in its entirety.

BACKGROUND OF THE INVENTION

1. Field of the Invention

The present invention relates to an information recording system in which a recording tape is wound onto a pair of reels inside a case, and to a magazine used during the manufacture of the information recording system.

2. Related Art

Technology is known in which a fixed head, disposed at a position that a tape passes by so as to make sliding contact with the tape during recording and reproduction, is moved by rotation to a specific position during cleaning, and a cleaning pad makes sliding contact with the head at this specific position (see, for example, Japanese Patent Application Laid-Open (JP-A) No. 6-195650).

In the technology described above, limitations such as a short cleaning stroke arise due to the cleaning pad making sliding contact with the head accompanying rotational motion of the head.

SUMMARY

The present invention relates to an information recording system that can perform good cleaning of a head in a configuration in which a recording tape travels between a pair of reels that are provided inside a case, and also relates to a magazine used during the manufacture of the information recording system.

A first aspect of the present invention is an information recording system that includes: a case; a head provided inside the case; a recording tape that travels inside the case due to rotation of a pair of reels that are provided inside the case, with at least one of information writing or information reading performed to or from the recording tape by the head while the recording tape is in contact with the head; a drive mechanism that drives the head between an in-use position contacting the recording tape and a cleaning position separated from the in-use position; and a cleaning device that is provided inside the case, and that cleans the head when positioned in the cleaning position by rubbing against the head in a direction different from a direction of movement of the head from the in-use position to the cleaning position.

In the information recording system of the first aspect, the recording tape travels due to rotation of the pair of reels during information writing or information reading to or from the recording tape. The head performs writing of information to the recording tape or reading of information that has been written to the recording tape while positioned at the in-use position and in contact with the travelling recording tape. In order to clean the head, the head is moved from the in-use position to the cleaning position by the drive mechanism, or is maintained in a state positioned in the cleaning position. At the cleaning position, the head is cleaned by the cleaning device while being rubbed against in a different direction to the direction of movement between the in-use position and the cleaning position.

In the present information recording system, since the cleaning device is disposed inside the case, the head can be cleaned even in the configuration in which the pair of reels and the head are provided inside the case. Since the movement direction of the head is different to the cleaning direction, in other words, since the cleaning operation is independent of the moving operation of the head, the range and stroke, for example, when cleaning the head are not restricted by the movement (the range and stroke) between the in-use position and the cleaning position of the head.

The information recording system of the first aspect accordingly enables good cleaning of the head in the configuration in which the recording tape travels between the pair of reels provided inside the case.

A second aspect of the present invention is an information recording system of the first aspect wherein the cleaning device is disposed on one width direction side of the recording tape with respect to the head that is positioned in the in-use position; and the cleaning device cleans the head by rubbing against the head in a direction along a travel direction of the recording tape.

In the information recording system of the second aspect, the head is switched between the in-use position and the cleaning position by an operation including a moving operation in the recording tape width direction. The head positioned at the cleaning position is cleaned as the cleaning device is rubbed against the head in the direction along the travel direction of the recording tape. The range and stroke, for example, during cleaning of the head are not restricted by the travel path of the recording tape, since the cleaning direction by the cleaning device is not a direction that intersects with the travel direction of the recording tape. In other words, the cleaning range and stroke of the head are secured in the limited space inside the case, contributing to making the device more compact.

A third aspect of the present invention is an information recording system of the first aspect or second aspect further including a separating mechanism that separates the head from the recording tape in a thickness direction of the recording tape before driving the head between the in-use position and the cleaning position.

In the information recording system of the third aspect, the separating mechanism separates the head and the recording tape in the recording tape thickness direction on movement of the head by the drive mechanism. The recording tape is accordingly protected from the moving head.

A fourth aspect of the present invention is an information recording system of any one of the first aspect to the third aspect further including a retention unit that retains the head in the cleaning position except in cases in which at least one of information writing or information reading is being performed to or from the recording tape by the head.

In the information recording system of the fourth aspect, the head does not make contact with the travelling recording tape except for in cases of performing information writing or information reading to or from the recording tape. The head is accordingly prevented from becoming dirty due to rubbing against the recording tape, contributing to a reduction in the number of times of cleaning. The retention unit may be configured so as to also be in charge of the drive mechanism.

A fifth aspect of the present invention is an information recording system of any one of the first aspect to the fourth aspect: the cleaning device includes a cleaning member, and a drive unit that moves the cleaning member along a travel path of the recording tape in a state in which the cleaning member is in contact with the head; and the cleaning member is replaceable from outside of the case due to the cleaning member being detachably mounted to the drive unit.

In the information recording system of the fifth aspect, the cleaning member configuring the cleaning device is detachably mounted to the drive unit that is an element of the case of the cleaning device. A cleaning member that has been used up through cleaning of the head can be replaced with a new cleaning member.

A sixth aspect of the present invention is an information recording system of the fifth aspect, wherein the cleaning member includes a cleaning tape, a pair of winding shafts that take up and feed out the cleaning tape, and a retaining member that retains the pair of winding shafts; and the drive unit of the cleaning device is provided at the case and drives one of the winding shafts, and the cleaning device further includes a support shaft that rotatably supports the other of the winding shafts.

In the information recording system of the sixth aspect, after removing a used-up cleaning member, a new cleaning member is mounted to the case (information recording system) by coupling one of the pair of winding shafts to the drive unit, and coupling the other winding shaft to the support shaft. The cleaning member is accordingly replaced.

A seventh aspect of the present invention is an information recording system of the fifth aspect, wherein the cleaning member includes a cleaning tape, a winding shaft that takes up and feeds out the cleaning tape, a leader member provided at a leading end of the cleaning tape, and a retaining member that retains the winding shaft and the leader member; the cleaning device includes a support shaft that is provided at the case and rotatably supports the winding shaft; and the drive unit of the cleaning device rotates a drive shaft at which the leader member is mounted.

In the information recording system of the seventh aspect, after removing a used-up cleaning member, once the winding shaft of a new cleaning member has been coupled to the support shaft, the leader member is mounted to the drive shaft. The cleaning member is thereby mounted to the case (information recording system), and the cleaning member is replaced.

An eighth aspect of the present invention is a magazine that includes: a pair of reels to which a common recording tape is coupled so as to be capable of being taken up and fed out; a cleaning member that cleans a head that is provided at an information recording system and performs at least one out of information writing or information reading to or from the recording tape while the recording tape is in contact with the head; an upper cartridge that retains the pair of reels and the cleaning member at predetermined positions so that the pair of reels and the cleaning member are transferred to the information recording system at the predetermined positions; and a lower cartridge that is detachably mounted at the upper cartridge, and that houses the pair of reels and the cleaning member between the lower cartridge and the upper cartridge.

The magazine of the eighth aspect is used during assembly of the pair of reels to a case of the information recording system. More specifically, after the lower cartridge of the magazine has been removed from the upper cartridge and the upper cartridge has been set on a receiving portion of the information recording system, the pair of reels and the cleaning member are positioned at the respective transfer positions with respect to the receiving portion of the information recording system. In this state, the pair of reels and the cleaning member are transferred to the information recording system, and a retained state of the pair of reels and the cleaning member to the upper cartridge is released. The pair of reels and the cleaning member can accordingly be easily assembled to the receiving portion of the information recording system. That is to say, the manufacture of the information recording system is simplified.

As explained above, the information recording system according to the aspects enables good cleaning of the head in a configuration in which the recording tape travels between the pair of reels provided inside the case.

BRIEF DESCRIPTION OF THE DRAWINGS

Detailed explanation follows regarding exemplary embodiments of the present invention, with reference to the following drawings.

DETAILED DESCRIPTION

Explanation follows regarding an information recording system 10 according to an exemplary embodiment, with reference to FIG. 1 to FIG. 9B. For ease of explanation, in FIG. 2 the arrow UP indicates an upwards direction, and the arrow DN indicates a downwards direction.

Outline of the Overall Configuration of the Information Recording System

Figure 1:
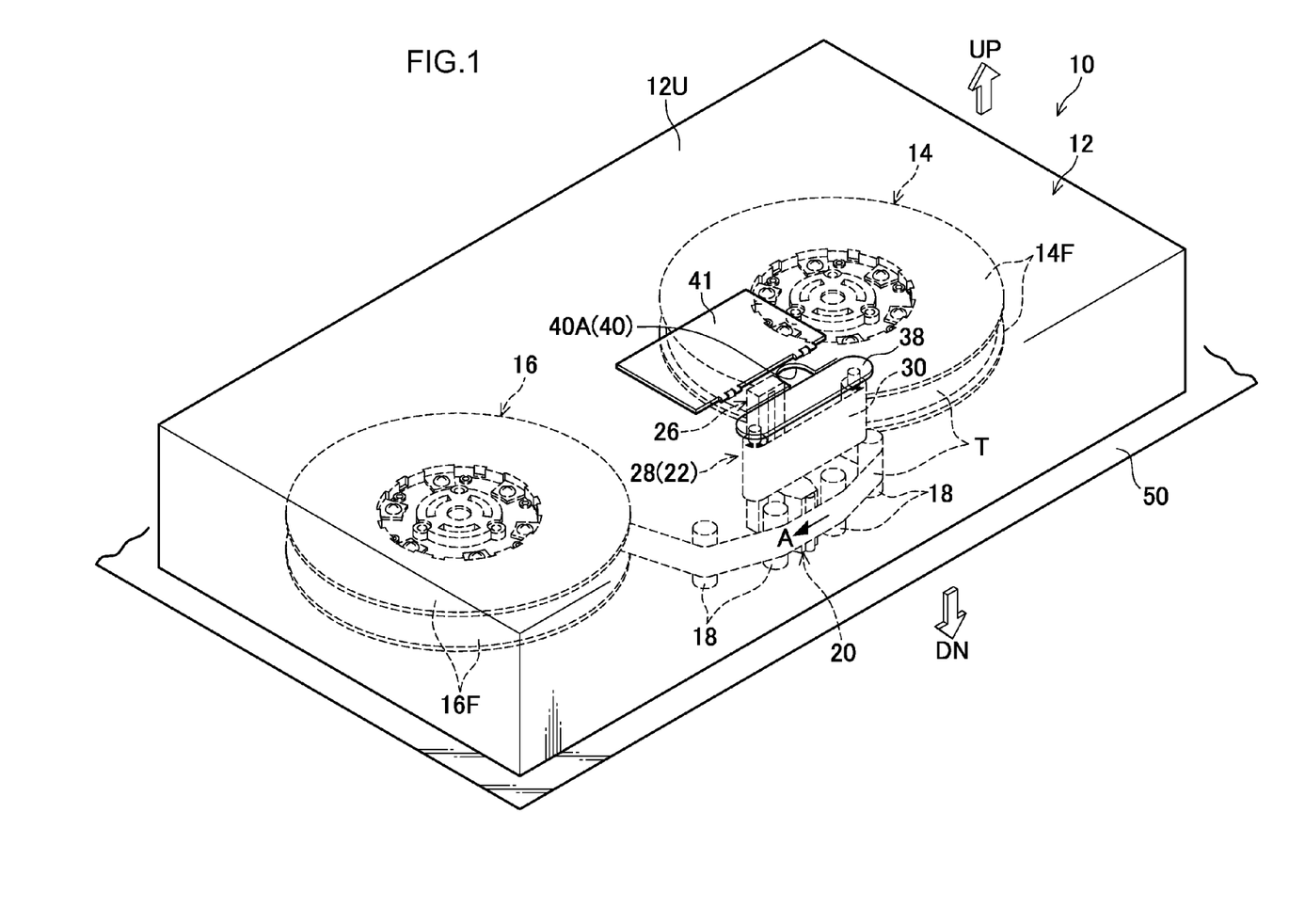
FIG. 1 is a perspective view illustrating an overall schematic configuration of an information recording system according to an exemplary embodiment.

As shown in FIG. 1, the information recording system 10 is provided with a case 12, and a pair of reels 14, 16 housed inside the case 12. The case 12 is not formed with an opening portion for a user to take out and put in the reels 14, 16, and the reels 14, 16 are housed inside the case 12 at all times, including during recording or reproduction of information, and during storage.

A recording tape T such as a magnetic tape serving as an information recording and reproduction medium is wound onto the reel 14 such that it is capable of being fed out. An end portion of the recording tape T is connected to the reel 16 so as to be capable of being taken up. In the information recording system 10, the recording tape T that has been fed out from the reel 14 that rotates about a rotation axis aligned along an up-down direction is taken up by the reel 16 that rotates about a rotation axis aligned along the up-down direction. The recording tape T can also be wound back from the reel 16 onto the reel 14. Namely, the reel 14 configures a reel that feeds out the recording tape T, and the reel 16 configures a reel that takes up the recording tape T. The recording tape T is wound in opposite directions onto the reel 14 and the reel 16.

Figure 3:
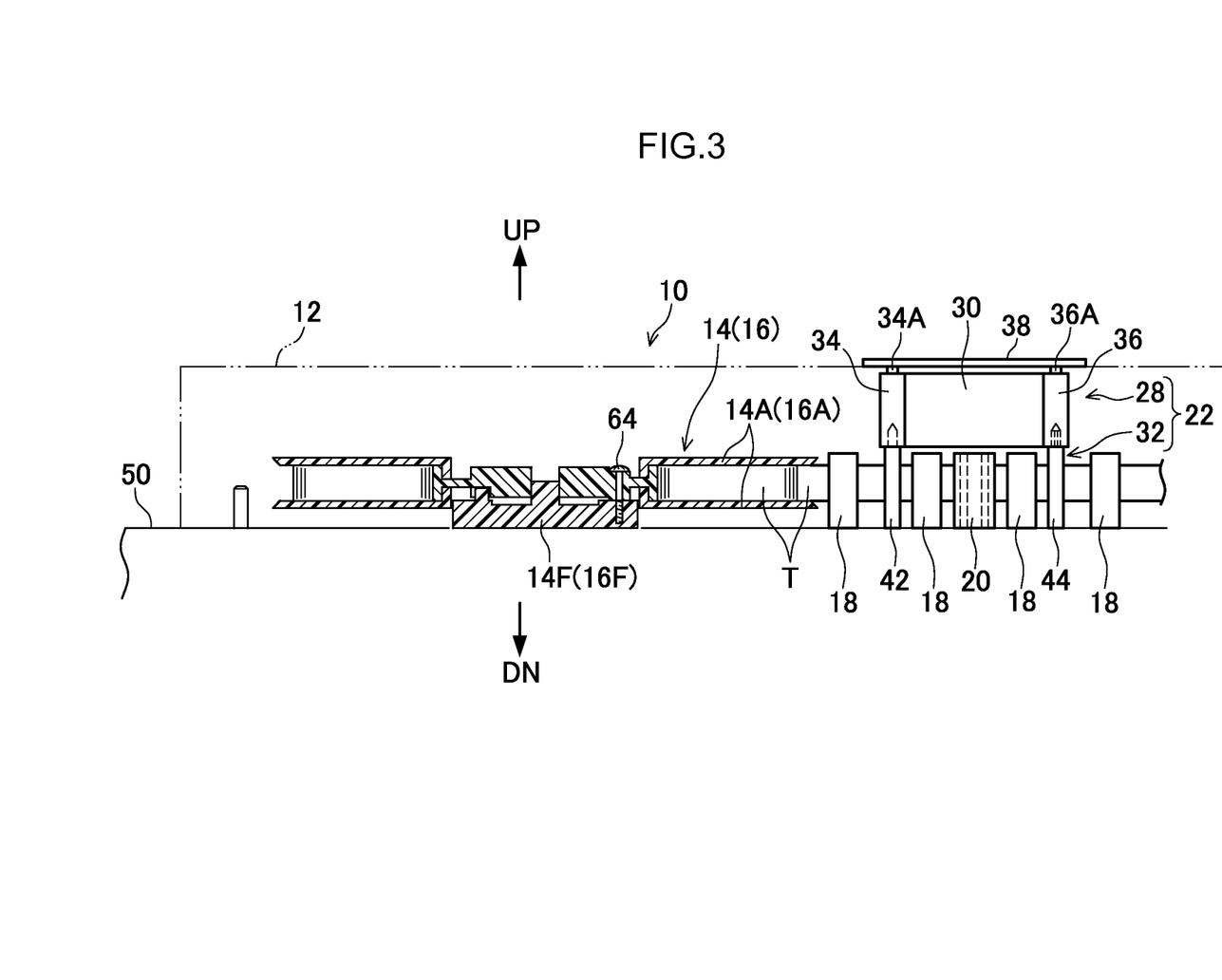
FIG. 3 is a cross-section schematically illustrating a portion inside the information recording system according to the exemplary embodiment.

As shown in FIG. 3, the reels 14, 16 are joined and are fixed to rotation members 14A, 16A that are provided inside the case 12 so as to rotate as a unit with the rotation members 14A, 16A. FIG. 3 is a cross-section schematically illustrating a portion of the information recording system 10. The rotation members 14A, 16A are coupled directly to motors, not shown in the drawings, which are disposed directly beneath the respective rotation members 14A, 16A. The rotation members 14A, 16A are driven to rotate synchronously such that a travelling speed of the recording tape T which passes by a magnetic head 20, described later, is substantially uniform.

Figure 4A:
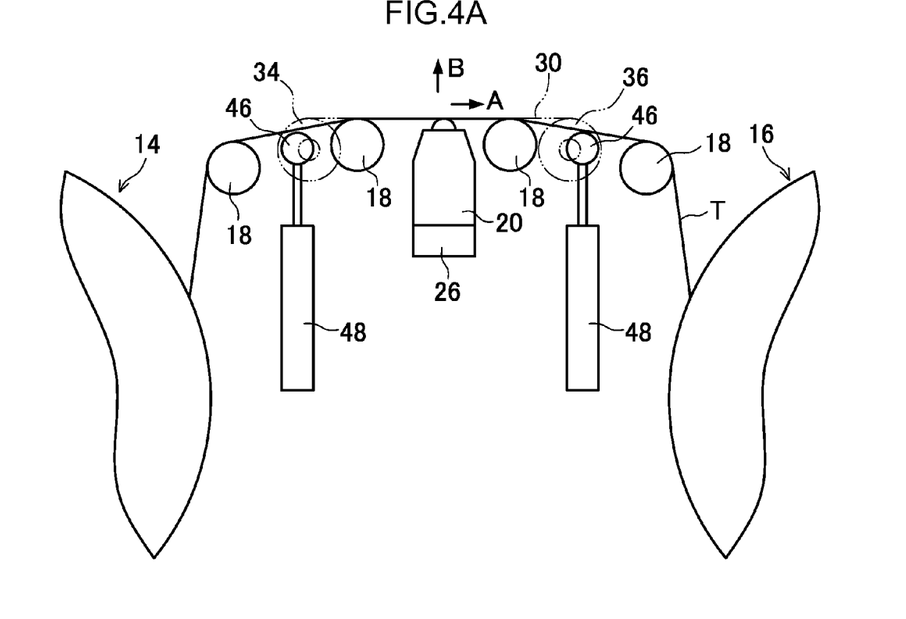
FIG. 4A is a diagram to explain operation of a tape separating mechanism configuring the information recording system according to the exemplary embodiment, and is a plan view schematically illustrating a state in which a recording tape is positioned at a read-write position.
Figure 4B:
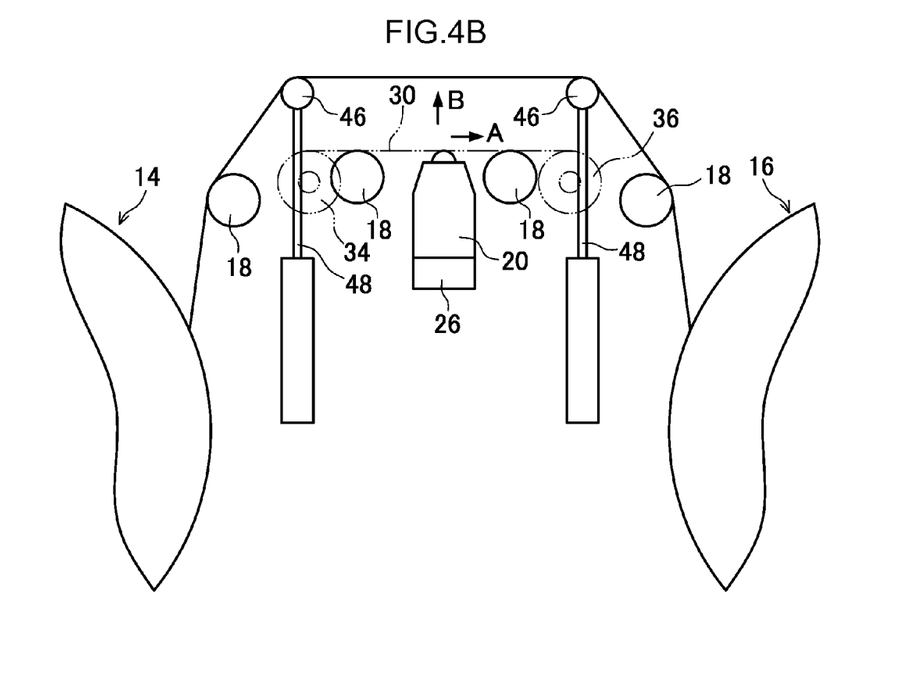
FIG. 4B is a diagram to explain operation of the tape separating mechanism configuring the information recording system according to the exemplary embodiment, and is a plan view schematically illustrating a state in which a recording tape is positioned at a separation position.

As shown in FIG. 4A and FIG. 4B, plural tape guides 18 are provided inside the case 12. The plural tape guides 18 define the travel path of the recording tape T inside the case 12. The magnetic head 20 serving as a head is provided at a central portion (a portion between two adjacent tape guides 18) of the travel path of the recording tape T inside the case 12 that is defined by the plural tape guides 18. The magnetic head 20 is configured so as to perform at least one of recording (writing) of information to the recording tape T or reproduction (reading) of information that is recorded on the recording tape T.

In the information recording system 10 according to the present exemplary embodiment, the magnetic head 20 is configured so as to be capable of performing information recording to the recording tape T and reproduction of existing previous information on the recording tape T while making sliding contact with the recording tape T that is travelling on the travel path. Accordingly, the information recording system 10 is configured such that recording and reproduction of information of the recording tape T can be performed within the recording capacity of the inbuilt recording tape T without exchanging the recording tape T (i.e., the reels 14, 16 on which the recording tape T is wound).

The information recording system 10, in which the recording tape T is not taken in and out of the case 12, is inbuilt with a cleaning device 22 that cleans the magnetic head 20 inside the case 12. The cleaning device 22 is disposed inside the case 12 at a different position to the position (in-use position) at which the recording and reproduction of information to and from the recording tape T is performed by the magnetic head 20. The information recording system 10 is therefore provided with a head drive device 24 serving as a drive mechanism that drives the magnetic head 20 between the in-use position and the position where cleaning is performed by the cleaning device 22 (referred to below as a cleaning position). The information recording system 10 is further provided with a tape separating mechanism 26 serving as a separating mechanism that separates (retract) the recording tape T when the magnetic head 20 is moved by the head drive device 24. More specific explanation thereof is given below.

Cleaning Device Configuration

The cleaning device 22 is disposed at an upper side that is one width direction side of the recording tape T with respect to the magnetic head 20 (the recording tape T travel path) so as not to overlap with the recording tape T, as shown in FIG. 3 and FIG. 5 to FIG. 7. The cleaning device 22 includes a cleaning tape assembly 28 serving as a replaceable cleaning member, and a case 12 side supporting drive mechanism 32 that drives a cleaning tape 30 of the cleaning tape assembly 28.

Figure 2:
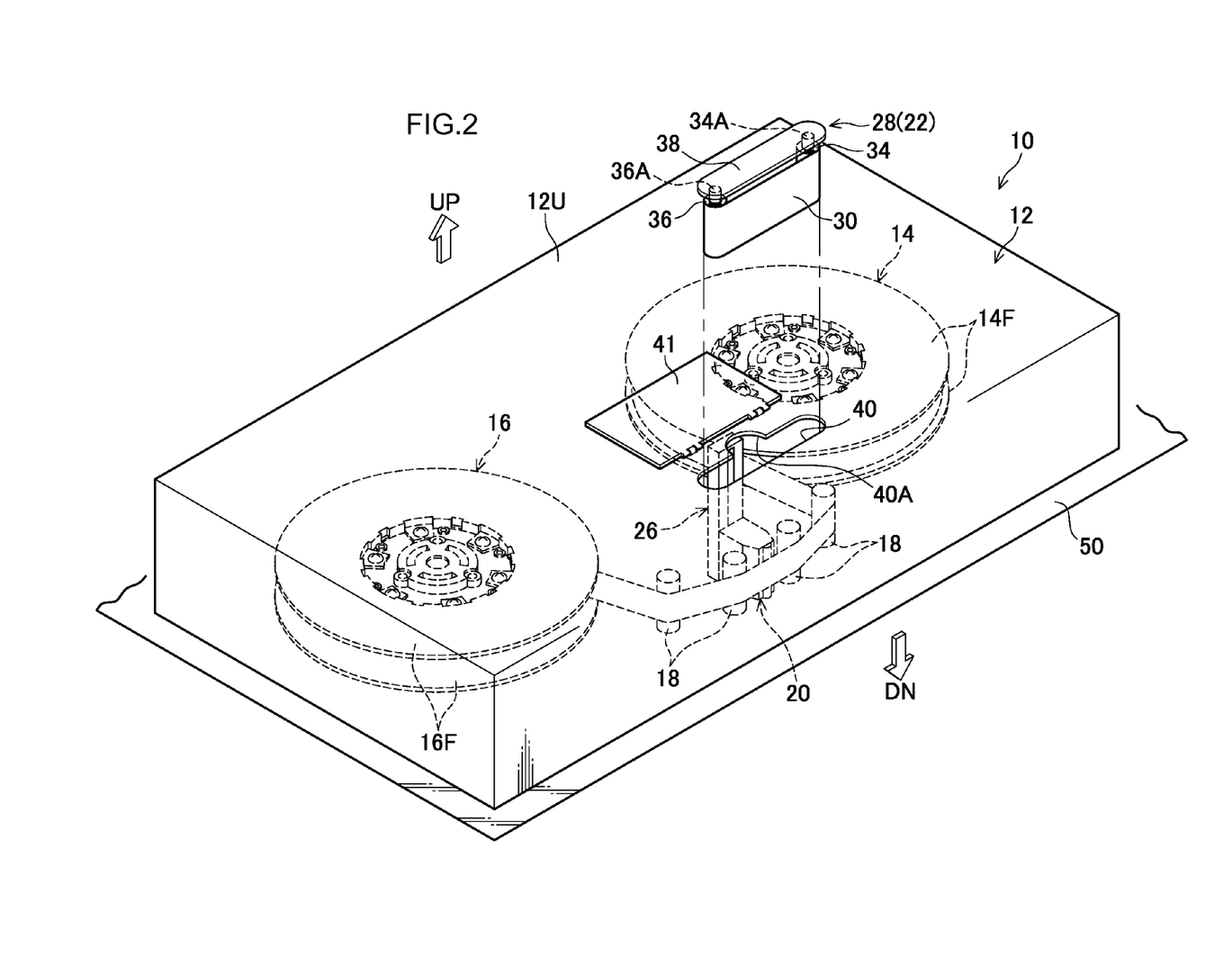
FIG. 2 is a perspective view illustrating the information recording system according to the exemplary embodiment in a state in which a cleaning tape assembly has been removed.
Figure 8:
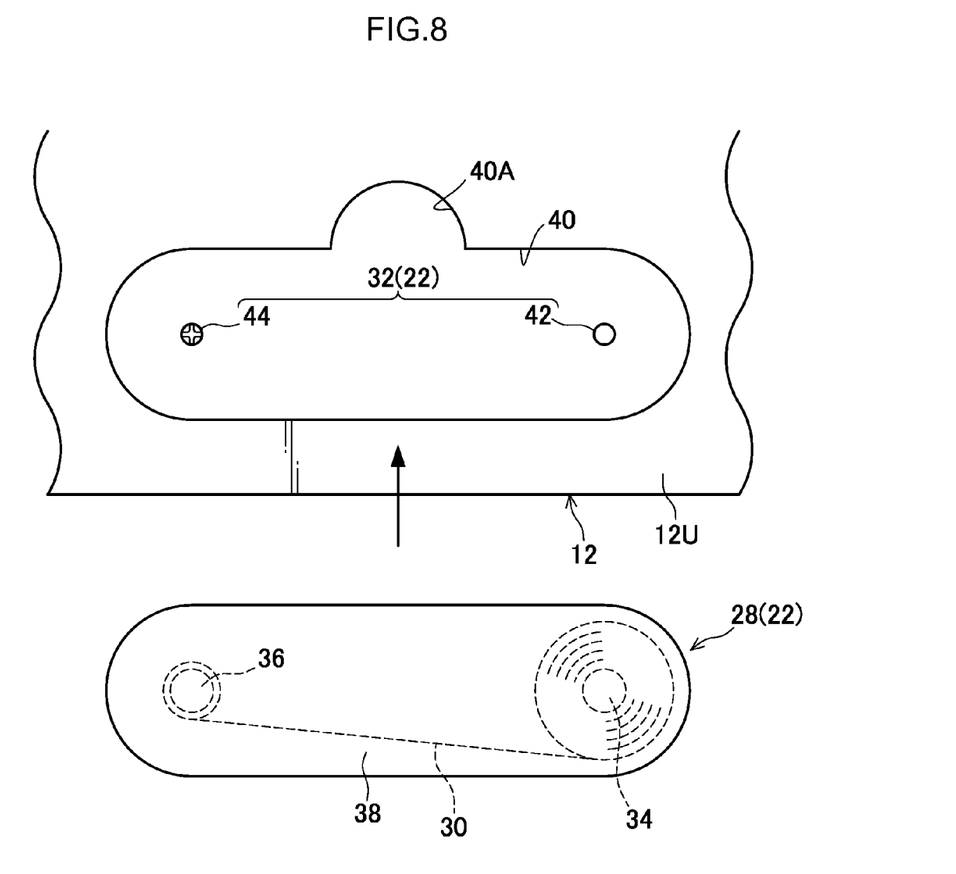
FIG. 8 is a plan view schematically illustrating a cleaning tape assembly and an insertion hole that configure the information recording system according to the exemplary embodiment.

As shown in FIG. 2 and FIG. 8, the cleaning tape assembly 28 includes a feed-out roll 34 serving as one of a pair of winding shafts, and a take-up roll 36 also serving as the other of the pair of winding shafts. The cleaning tape 30 is wound onto the feed-out roll 34 such that it can be fed out, and one end of the cleaning tape 30 is coupled to the take-up roll 36 such that it can be taken up.

The feed-out roll 34 and the take-up roll 36 are supported at respective support shafts 34A, 36A by a holder 38 that serves as a retaining member, so as to be rotatable about rotation axes disposed along the up-down direction. Although omitted from the drawings, the holder 38 may be provided with tape guides on the feed-out roll 34 side and the take-up roll 36 side respectively in order to give the cleaning tape 30 a uniform travel path regardless of the amount of the cleaning tape 30 that has been fed out from the feed-out roll 34. Such tape guides may also be provided on the case 12. It is also possible to make configuration whereby contact can be avoided between the cleaning tape 30 and the magnetic head 20 moving between the in-use position and the cleaning position by configuring tape guides on the case 12 with a movable structure as that of the tape separating mechanism 26 (described later).

The cleaning tape assembly 28 is assembled such that at least the feed-out roll 34, the take-up roll 36 and the cleaning tape 30 are positioned inside the case 12 through an insertion hole 40 that is formed in an upper wall 12U of the case 12. The insertion hole 40 is configured such that it is opened and closed by a cover 41 provided to the upper wall 12U of the case 12. An auxiliary hole portion 40A is provided contiguously to the insertion hole 40 to allow access to a back face of the holder 38 with for example a finger or a tool in an open state of the cover 41 of the insertion hole 40.

As shown in FIG. 3, the case 12 is provided with a support shaft 42 that supports the feed-out roll 34 of the mounted cleaning tape assembly 28 so as to rotate freely about an axis disposed along the up-down direction, and a drive shaft 44 that is coupled to the take-up roll 36 so as to be capable of transmitting rotation to the take-up roll 36. The support shaft 42 and the drive shaft 44 configure main portions of the supporting drive mechanism 32 provided on the case 12 side. The drive shaft 44 is configured to be driven to rotate by a drive motor, not shown in the drawings, and corresponds to a drive unit of the present exemplary embodiment.

The feed-out roll 34 is mounted and demounted to the support shaft 42 by relative movement in the up-down direction between the support shaft 42 and the feed-out roll 34. The take-up roll 36 is mounted and demounted to the drive shaft 44 by relative movement in the up-down direction between the drive shaft 44 and the take-up roll 36. The shape of the outer edge of the insertion hole 40 is determined such that the feed-out roll 34 and the take-up roll 36 can be mounted and demounted to the support shaft 42 and the drive shaft 44 by up-and-down insertion or removal of the cleaning tape assembly 28 to or from the insertion hole 40 of the case 12 in a state in which an anchored state provided by the anchoring structure mentioned above of the holder 38 has been released. Note that a member such as a guide wall may be provided to guide the feed-out roll 34 and the take-up roll 36 onto the support shaft 42 and the drive shaft 44.

The cleaning device 22 is accordingly configured such that when the drive shaft 44 is driven to rotate in a mounted state of the cleaning tape assembly 28, the cleaning tape 30 is taken up by the take-up roll 36 while being fed out from the feed-out roll 34. Namely, the cleaning tape 30 is configured so as to travel in a direction along the travel direction (the arrow A direction) of the recording tape T at the placement position of the magnetic head 20. In the cleaning position, the magnetic head 20 is rubbed against by the cleaning tape 30 travelling in the arrow A direction, thereby cleaning the magnetic head 20.

Head Drive Device Configuration

Figure 5:
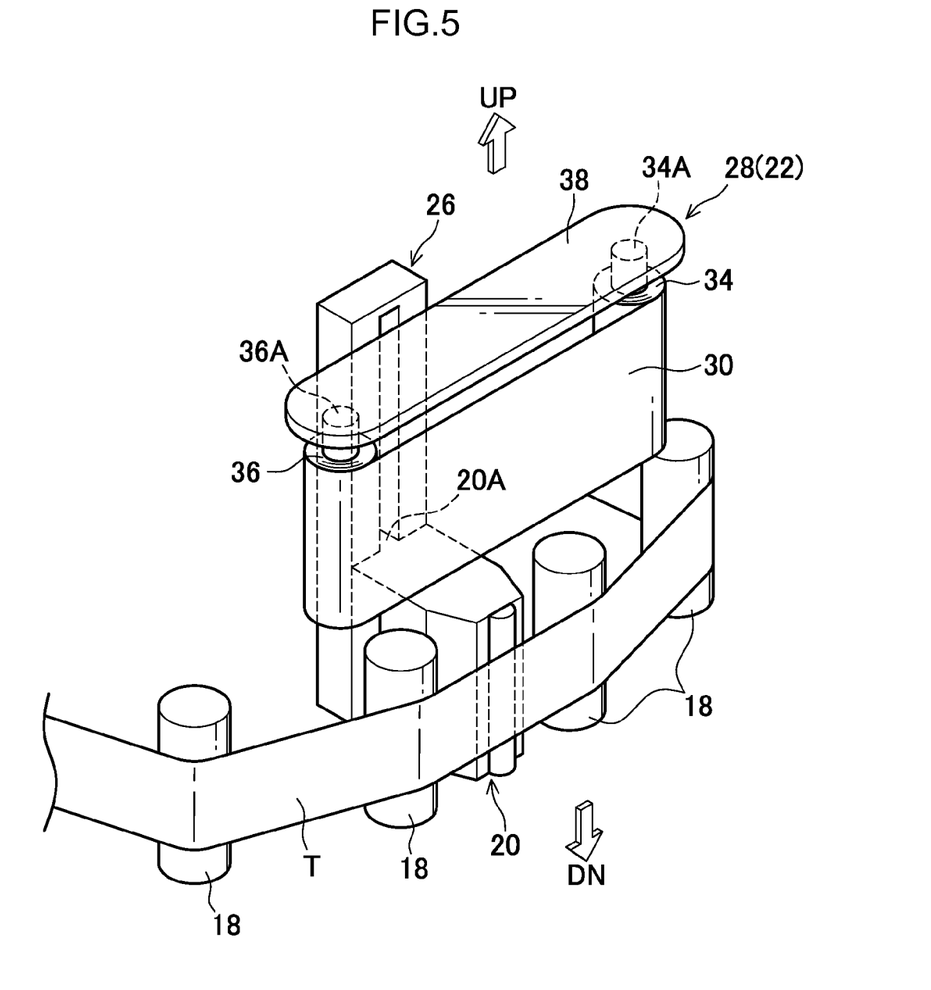
FIG. 5 is a perspective view illustrating a state in which a magnetic head configuring the information recording system according to the exemplary embodiment is positioned at an in-use position.
Figure 6:
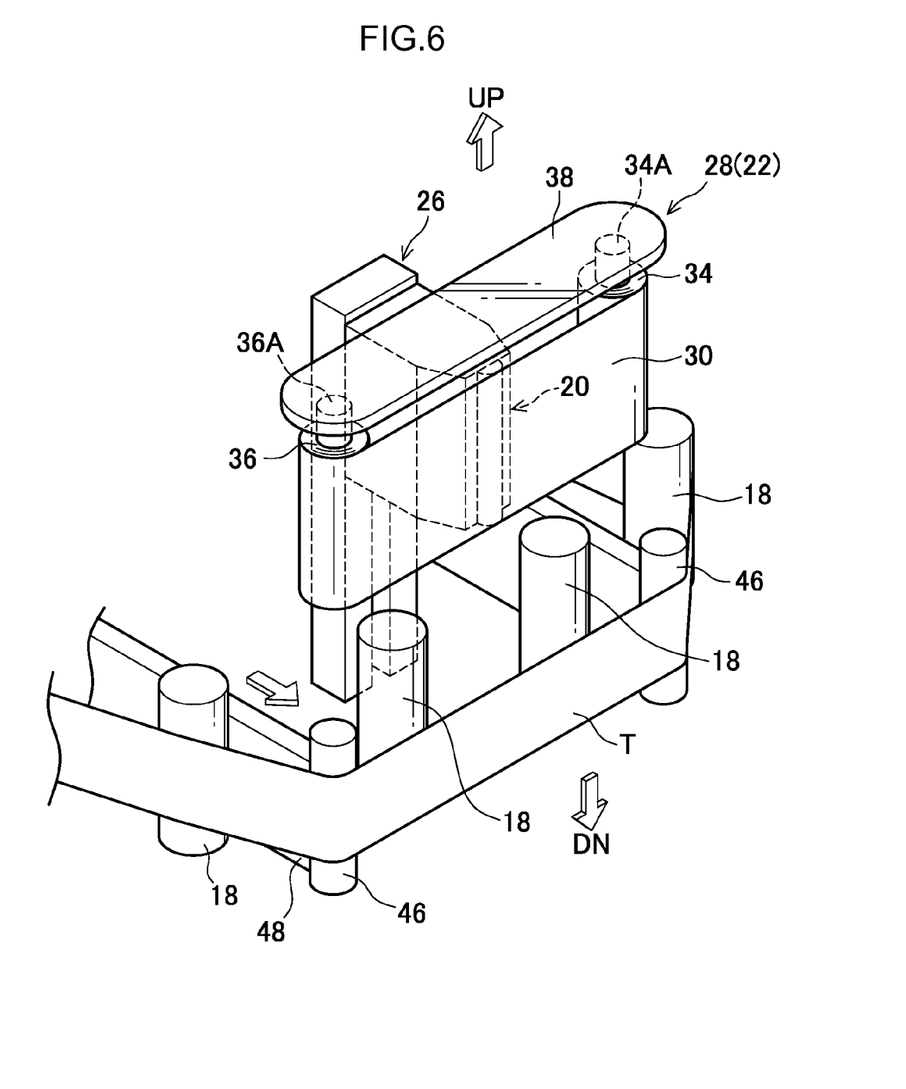
FIG. 6 is a perspective view illustrating a state in which the magnetic head configuring the information recording system according to the exemplary embodiment is positioned at a cleaning position.

As shown in FIG. 5 and FIG. 6, the head drive device 24 is configured so as to move the magnetic head 20 between the in-use position and the cleaning position. In the present exemplary embodiment, the cleaning position is directly above the in-use position, and the head drive device 24 is configured to move the magnetic head 20 back and forth in the up-down direction. By way of an example, the head drive device 24 is configured as a linear actuator disposed on the opposite side (the back face side) of the magnetic head 20 to the recording tape T side, and moves a driven portion 20A (see FIG. 5) provided on the back face side of the magnetic head 20 up and down.

Examples of configurations that may be adopted for the head drive device 24 include motor actuators provided with a direct drive mechanism such as a linear motor, a rack and pinion or a feed screw, a fluid pressure cylinder using fluid pressure, or a configuration using for example a solenoid. Moreover, in the present exemplary embodiment, the head drive device 24 is further configured to function as a retention unit that retains the magnetic head 20 at the in-use position or the cleaning position. Note that a retention unit may be provided independently of the head drive device 24.

Figure 7A:
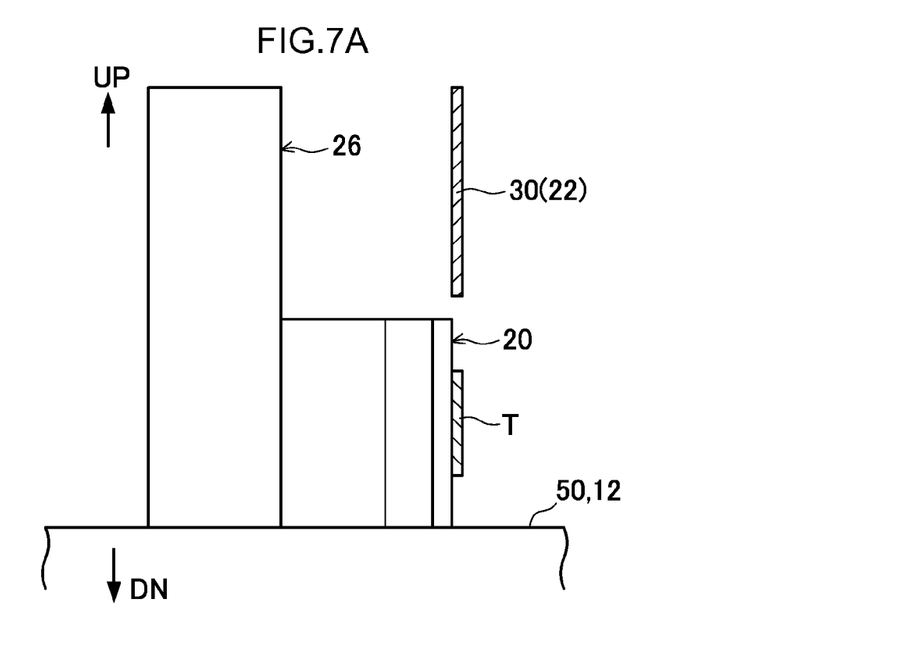
FIG. 7A is a diagram illustrating a position where the magnetic head configuring the information recording system according to the exemplary embodiment is retained by a head drive device, and is a side view schematically illustrating a state in which the magnetic head is retained at an in-use position.
Figure 7B:
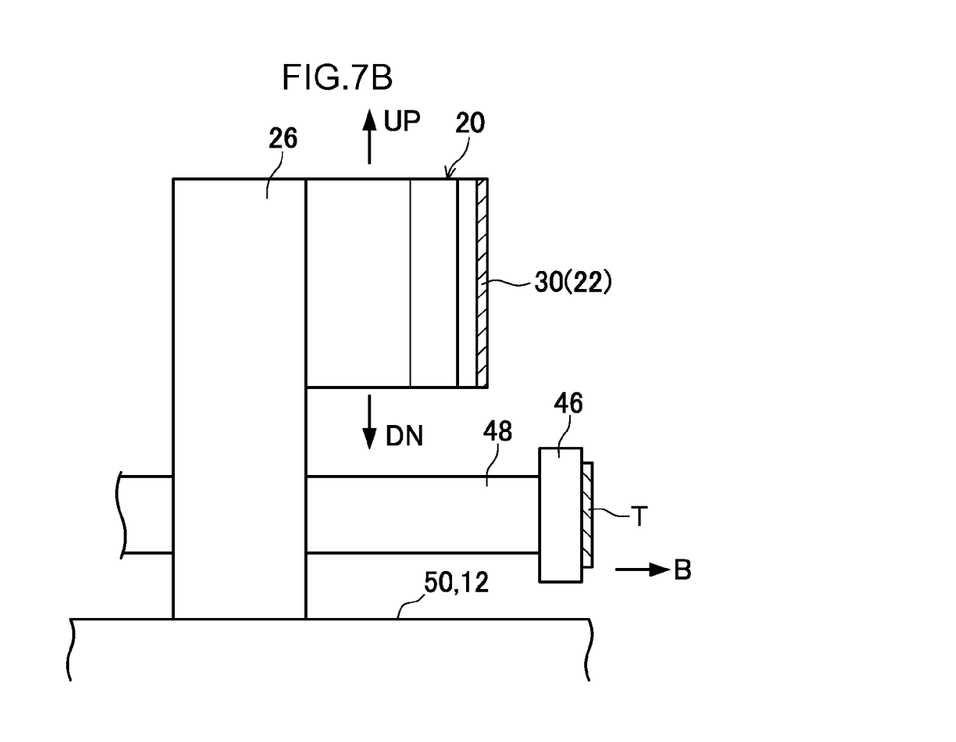
FIG. 7B is a diagram illustrating a position where the magnetic head configuring an information recording system according to the exemplary embodiment is retained by the head drive device, and is a side view schematically illustrating a state in which the magnetic head is retained at a cleaning position.

The magnetic head 20 retained at the cleaning position contacts the cleaning tape 30 between the feed-out roll 34 and the take-up roll 36 as shown in FIG. 7B. Configuration may be made such that on movement of the magnetic head 20 between the in-use position shown in FIG. 7A and the cleaning position shown in FIG. 7B, the drive shaft 44 is driven to reversely rotate by a small amount to loosen the tension of the cleaning tape 30 (to slacken the cleaning tape 30), in order to avoid contact between the cleaning tape 30 and the magnetic head 20 that is being moved.

Tape Separating Mechanism Configuration

The tape separating mechanism 26 is configured to separate the recording tape T from its usual position towards the opposite side to the head side in the tape thickness direction (on the arrow B side) on movement of the magnetic head 20 by the head drive device 24. As shown in FIG. 4A and FIG. 4B, in the present exemplary embodiment two of the tape guides 18 are provided on the reel 14 side and the reel 16 side with respect to the magnetic head 20 respectively.

The tape separating mechanism 26 further includes a pair of pressing rolls 46 that respectively press the recording tape T in the arrow B direction at positions between the reel 14 side tape guides 18 and the reel 16 side tape guides 18. Each of the pressing rolls 46 is capable of moving back and forth, that is, being moved to the arrow B direction and then returning after this movement by a linear actuator 48 connected on the opposite side to the arrow B side. The recording tape T is accordingly capable of moving back and forth between a read-write position (see FIG. 4A) where the recording tape T is entrained only over the tape guides 18 and is capable of contacting the magnetic head 20, and a separated position (see FIG. 4B) where the recording tape T is pushed in the arrow B direction by the pressing rolls 46 and separated from the magnetic head 20.

Examples of configurations that may be adopted for the linear actuators 48 include motor actuators provided with a direct drive mechanism configured by a linear motor, a rack and pinion or a feed screw, fluid cylinders using fluid pressure, or configurations using for example a solenoid.

Configuration of the Magazine

The information recording system 10 described above is configured (manufactured) by assembling the recording tape T, the reels 14, 16, and the cleaning tape assembly 28 to a mechanism section 50 not containing a recording tape T, reels 14, 16, or a cleaning tape assembly 28. In the present exemplary embodiment, the recording tape T, the reels 14, 16, and the cleaning tape assembly 28 are assembled to a common cartridge 52 to configure a magazine 54 prior to assembly to the mechanism section 50. More specific explanation follows thereof.

Figure 9A:
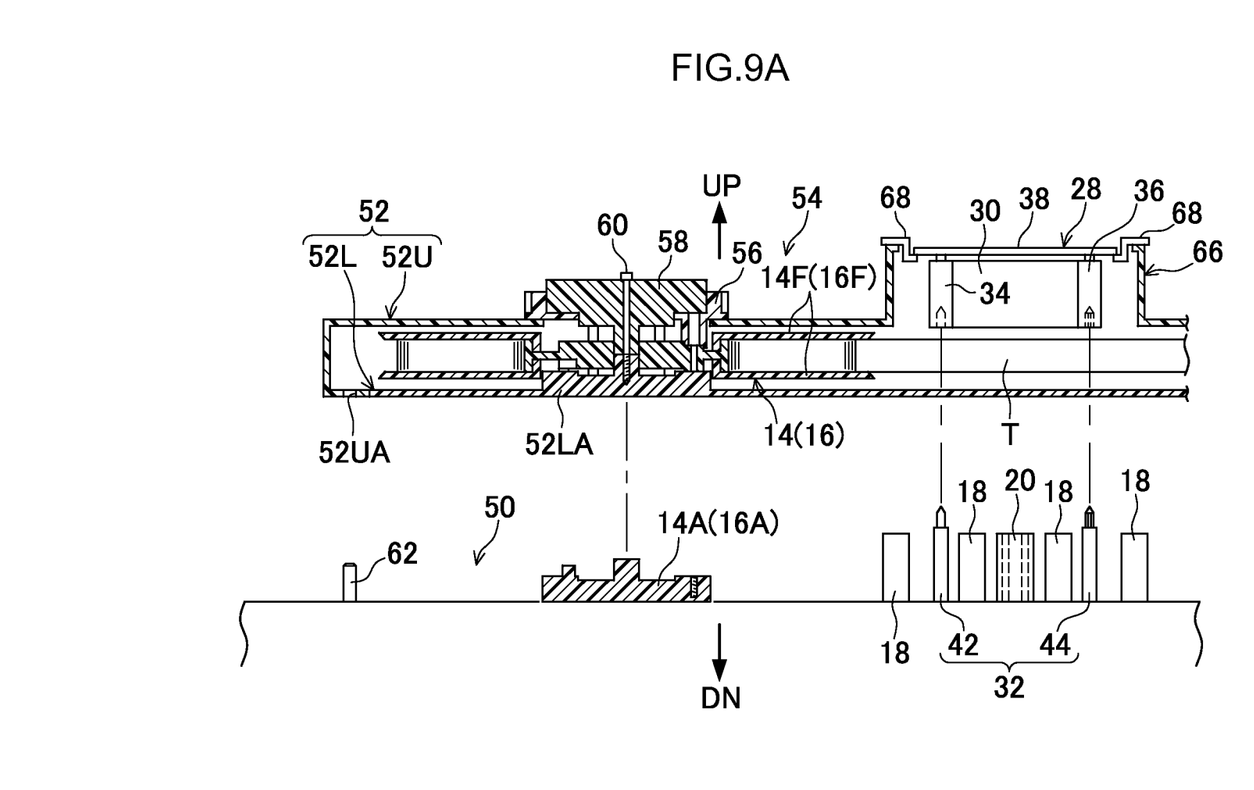
FIG. 9A is a diagram illustrating a magazine used during manufacture of the information recording system according to the exemplary embodiment, and is a cross-section schematically illustrating a state in which the magazine has been conveyed to a position of assembly to a mechanism section.

As shown in FIG. 9A, the cartridge 52 is configured by joining together an upper cartridge 52U and a lower cartridge 52L. The lower cartridge 52L is detachable with respect to the upper cartridge 52U.

The reels 14, 16 are rotatably supported by the upper cartridge 52U through rotation handles 56. Rotation of each of the rotation handles 56 with respect to the case 12 is restricted or locked by a common lock member, not shown in the drawings. Slackness and excessive tautness of the recording tape T inside the cartridge 52 are thereby avoided.

The reels 14, 16 are sandwiched from above and below between a pressing member 58 and a pressing portion 52LA of the lower cartridge 52L. Thereby, upper and lower flanges 14F, 16F of the reels 14, 16 are configured so as not to impinge on the inner faces of the cartridge 52. The lower cartridge 52L is retained to the upper cartridge 52U by a pressing screw 60 screwed into the pressing portion 52LA through the pressing member 58. Although omitted from the drawings, the pressing member 58 includes engagement clips that retain the reels 14, 16 to the upper cartridge 52U or prevent the reels 14, 16 from coming out of the upper cartridge 52U in a state in which the lower cartridge 52L is removed.

The upper cartridge 52U is formed with a positioning hole 52UA to which a positioning pin 62 of the mechanism section 50 fits together with so that the upper cartridge 52U is positioned. The dimensions and shape of the upper cartridge 52U that is positioned with respect to the mechanism section 50 with the positioning hole 52UA are determined such that the retained reels 14, 16 are positioned in a transfer position for fitting together with the rotation members 14A, 16A. Configuration is made such that in this transfer position, the reels 14, 16 are fixed to the rotation members 14A, 16A by screws 64, as shown in FIG. 3.

The upper cartridge 52U is further formed with a cleaner retention portion 66 that retains the cleaning tape assembly 28. The cleaner retention portion 66 retains the cleaning tape assembly 28 to the cartridge 52 in the same relative position to the reels 14, 16 as the relative position to the reels 14, 16 when inside the information recording system 10. In the present exemplary embodiment, a pair of slide anchor members 68 is provided at both end sides of the edges of a hole formed in the upper cartridge 52U such that the holder 38 can pass through. The slide anchor members 68 retain the cleaning tape assembly 28 to the upper cartridge 52U.

The cleaner retention portion 66 retains the feed-out roll 34 and the take-up roll 36 of the cleaning tape assembly 28 at the transfer position directly above the support shaft 42 and the drive shaft 44 in a state in which the upper cartridge 52U is positioned at the positioning hole 52UA by the positioning pin 62.

Figure 9B:
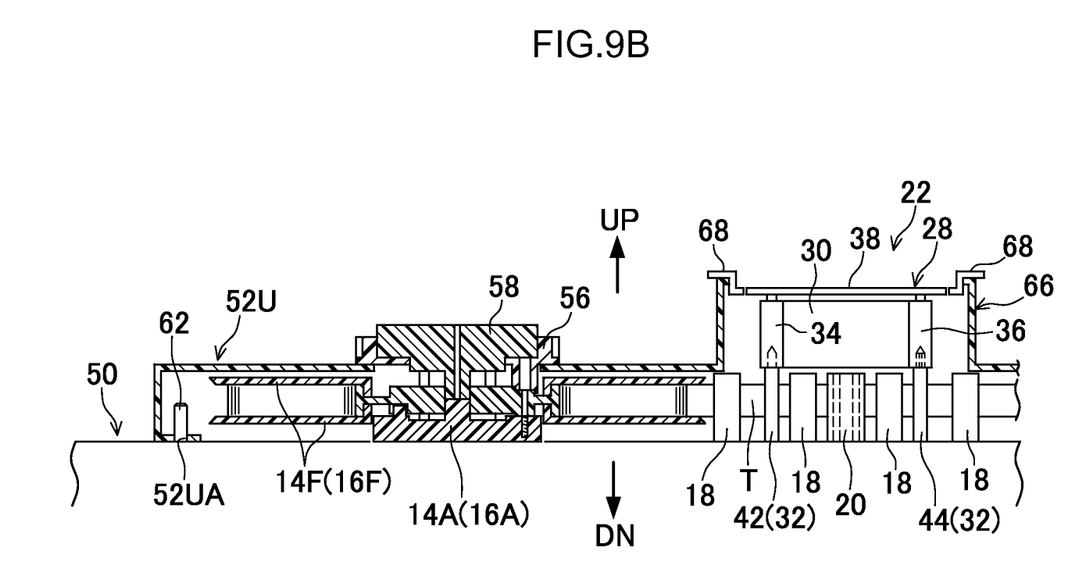
FIG. 9B is a diagram illustrating a magazine used during manufacture of the information recording system according to the exemplary embodiment, and is a cross-section schematically illustrating a process in which the magazine is used to assemble reels and a cleaning tape assembly to the mechanism section.

The anchored state of the slide anchor members 68 to the holder 38 is released when the pair of slide anchor members 68 are moved in a separation direction away from the retained state shown in FIG. 9A, and, as shown in FIG. 9B, the cleaning tape assembly 28 is mounted to the supporting drive mechanism 32. The pair of slide anchor members 68 is biased in a direction approaching each other by a biasing member such as a spring, not shown in the drawings. Configuration is made such that the cleaning tape assembly 28 is maintained in a retained state until the release operation described above due to this bias.

The magazine 54 is configured such that the reel 14, the reel 16 and the cleaning tape assembly 28 are incorporated in the cartridge 52.

Next, explanation follows regarding operation of the present exemplary embodiment.

The manufacture of the information recording system 10 configured as described above includes a process of preparing the mechanism section 50, and a process of conveying the magazine 54 as illustrated in FIG. 9A to a position for incorporation to the mechanism section 50. The reels 14, 16 that include the recording tape T are retained to the cartridge 52 during the conveyance process, thereby protecting the recording tape T and the reels 14, 16 (flanges 14F, 16F).

After the above conveyance process, as shown in FIG. 9B, the lower cartridge 52L is removed from the upper cartridge 52U of the cartridge 52, and the upper cartridge 52U is set on the mechanism section 50 such that the positioning pin 62 fits together with and is inserted into the positioning hole 52UA of the upper cartridge 52U. As a result, the reels 14, 16 and the cleaning tape assembly 28 are respectively positioned at the transfer positions.

In this state, the retained state of the reels 14, 16 by the pressing member 58 is released and the rotation lock of each of the rotation handles 56 by the lock member is also released. Next, each of the rotation handles 56 is rotated to align the rotation phase of the reels 14, 16 with the phase of the rotation members 14A, 16A (i.e., to match up the positions of the screw holes of the screws 64) and the reels 14, 16 are fixed to the rotation members 14A, 16A by the screws 64.

The pair of slide anchor members 68 are operated in separation directions moving away from each other in the cleaner retention portion 66. As a result, the anchored state of the slide anchor members 68 to the holder 38 is released and the slide anchor members 68 are mounted to the supporting drive mechanism 32. Namely, the feed-out roll 34 is mounted to the support shaft 42 and the take-up roll 36 is mounted to the drive shaft 44.

In this state, the mechanism section 50 is covered by an upper side member including the upper wall 12U of the case 12, thereby manufacturing the information recording system 10.

In the information recording system 10 configured as above, the reel 14 and the reel 16 are driven to synchronously rotate during recording of information to the recording tape T and during reproduction of information from the recording tape T. When this is performed, the recording tape T travels in the arrow A direction along the travel path defined by the tape guides 18, and information is written or information is read by the magnetic head 20.

The magnetic head 20 becomes dirty as a result of this writing and reading of information. At a request to remove this dirt, the magnetic head 20 is cleaned by the cleaning device 22 in the following manner.

When Head Positioned at In-Use Position

Explanation follows regarding a case in which the magnetic head 20 is cleaned immediately after information has been written to or read from the recording tape T. Note that the manner of cleaning in such a case is similar to the manner in a configuration in which the magnetic head 20 is normally positioned in the in-use position.

When cleaning of the magnetic head 20 is requested, firstly the linear actuator 48 is actuated and the recording tape T is moved from the read-write position to the separated position by the pressing rolls 46. Next, the head drive device 24 is actuated and the magnetic head 20 is moved from the in-use position to the cleaning position. The recording tape T is prevented from sustaining damage when this is being performed since the recording tape T is positioned at the separated position and is not rubbed against by the moving magnetic head 20.

After the magnetic head 20 has reached the cleaning position, the drive shaft 44 is actuated. The cleaning tape 30 thereby travels in the arrow A direction. The travelling cleaning tape 30 cleans the magnetic head 20 as it rubs against the magnetic head 20.

In a configuration in which the magnetic head 20 is normally positioned in the in-use position, the recording tape T is retained at the separated position by the tape separating mechanism 26 during the above cleaning operation, and then the magnetic head 20 is returned to the in-use position by the head drive device 24 after cleaning has been completed. Moreover, the recording tape T returns from the separated position to the read-write position by retracting the pressing rolls 46 by the tape separating mechanism 26 in synchronization with the rotation of the reels 14, 16.

When Head Positioned at Cleaning Position

In a configuration in which the magnetic head 20 is positioned at the cleaning position except for when performing information reading or writing from or to the recording tape T, the drive shaft 44 is actuated when cleaning of the magnetic head 20 is requested. The cleaning tape 30 thereby travels in the arrow A direction. The travelling cleaning tape 30 cleans the magnetic head 20 as it rubs against the magnetic head 20.

In such cases, the recording tape T is retained at the separated position by the tape separating mechanism 26 (the pressing rolls 46 and the linear actuators 48) until the magnetic head 20 is moved to the in-use position. In response to a request for writing or reading information to or from the recording tape T, the head drive device 24 moves the magnetic head 20 from the cleaning position to the in-use position, and the tape separating mechanism 26 moves the recording tape T from the separated position to the read-write position by retracting the pressing rolls 46 in synchronization with the rotation of the reels 14, 16. After writing or reading the information to or from the recording tape T, the recording tape T is moved to the separated position by the tape separating mechanism 26, after which the magnetic head 20 is moved to the cleaning position by the head drive device 24.

Accordingly, in a configuration in which the magnetic head 20 is positioned at the cleaning position except for when performing reading and writing of information from or to the recording tape T, the recording tape T does not rub against the magnetic head 20 for example when simply feeding out and taking up or winding back the recording tape T between the reels 14, 16. The magnetic head 20 is accordingly prevented from becoming dirty as a result of rubbing between the recording tape T and the magnetic head 20. This also contributes to reducing the number of times of cleaning of the magnetic head 20 by the cleaning device 22 (and the frequency of exchanging the cleaning tape assembly 28).

Cleaning Tape Assembly Replacement

The cleaning tape assembly 28 is replaced if the cleaning tape 30 has been determined to be used up accompanying cleaning of the magnetic head 20. Firstly, the cover 41 is operated to open the insertion hole 40. The holder 38 is lifted up by inserting for example a fingertip or tool through the auxiliary hole portion 40A to the back face side of the holder 38. The cleaning tape assembly 28 is thereby taken out from the case 12.

Next, a new cleaning tape assembly 28 or a cleaning tape assembly 28 that has been restored from a used up state is inserted into the case 12 through the insertion hole 40. Accompanying this action, the support shaft 42 is inserted (mounted) into the feed-out roll 34 and the drive shaft 44 is mounted to the take-up roll 36. Namely, the cleaning tape assembly 28 is set correctly on the supporting drive mechanism 32. Replacement of the cleaning tape assembly 28 is then completed after the insertion hole 40 is closed by the cover 41.

In the information recording system 10, the cleaning device 22 is disposed inside the case 12. The magnetic head 20 can accordingly be cleaned in a configuration in which the pair of reels 14, 16 and the magnetic head 20 are provided inside the case 12 such that access (including taking in and out) from the outside is not possible.

Moreover, since the movement direction (the up-down direction) of the magnetic head 20 by the head drive device 24 is different to the cleaning direction (a horizontal direction as the arrow A direction) by the cleaning tape 30, the cleaning operation is independent of the moving operation of the magnetic head 20 between the in-use position and the cleaning position. Accordingly, movement relating to the cleaning such as the range and stroke of the cleaning of the magnetic head 20 are not restricted by the movement (range and stroke) of the magnetic head 20 between the in-use position and the cleaning position. Accordingly, in the present exemplary embodiment, cleaning can be performed over a long stroke as the cleaning tape 30 that is elongated in the arrow A direction rubs against the magnetic head 20.

In the information recording system 10, good cleaning of the magnetic head 20 is accordingly enabled in a configuration in which the recording tape T travels between the pair of reels 14, 16 provided inside the case 12.

In particular, in the present information recording system 10, the cleaning device 22 is disposed to one side in the recording tape T width direction of the magnetic head 20 positioned in the in-use position. The cleaning direction by the cleaning tape 30 is accordingly configured as the arrow A direction along the recording tape T travel direction. Namely, since the travel direction of the cleaning tape 30 of the cleaning device 22 does not intersect with the travel direction of the recording tape T, movement relating to the cleaning such as the range and stroke of the cleaning of the magnetic head 20 is not restricted by the travel path of the recording tape T. In other words, the cleaning range and stroke of the magnetic head 20 is ensured even in the limited space inside the case 12, which contributes to making the device more compact, in comparison to a structure that is not configured with the cleaning tape 30 travelling in the arrow A direction in the vicinity directly above a cleaning device 70.

Moreover, in the present information recording system 10, the recording tape T is positioned in the separated position by the tape separating mechanism 26 when the magnetic head 20 is being moved by the head drive device 24. The recording tape T is accordingly prevented from making contact with the moving magnetic head 20, thereby protecting the recording tape T.

Moreover, in the present information recording system 10, the cleaning tape assembly 28 that configures the cleaning device 22 is replaceable. A cleaning tape assembly 28 in which the cleaning tape 30 has been used up through cleaning of the magnetic head 20 can accordingly be replaced for a new or maintained cleaning tape assembly 28, thereby enabling good cleaning of the magnetic head 20 with a fresh cleaning tape 30. In particular, the cleaning tape 30 is assembled as a cleaning tape assembly 28 with the feed-out roll 34, the take-up roll 36 and the holder 38. Therefore, a used-up cleaning tape 30 can be easily replaced.

Moreover, the magazine 54 is used during the manufacture of the information recording system 10. As well as allowing easy assembly of the reels 14, 16, the cleaning tape assembly 28 can also be easily assembled to the supporting drive mechanism 32 of the mechanism section 50.

Modified Example of Cleaning Device

Figure 10:
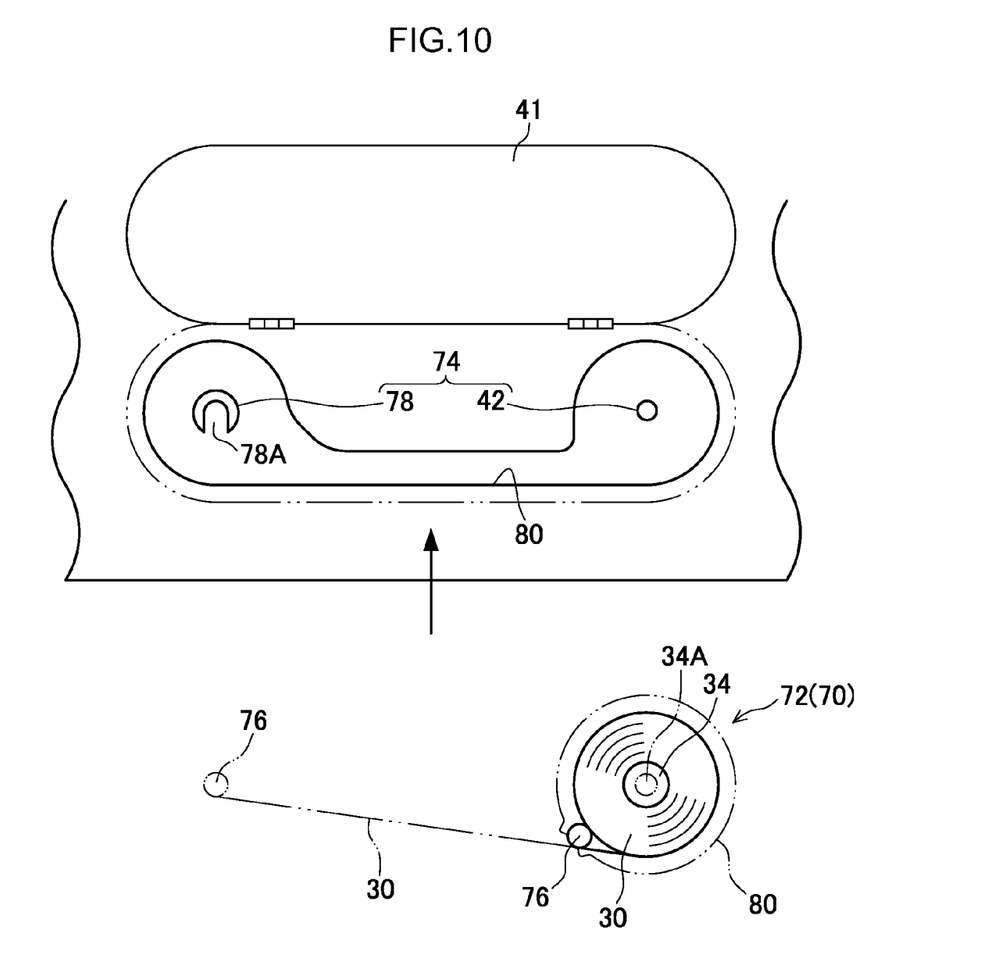
FIG. 10 is a plan view schematically illustrating a cleaning tape assembly and an insertion hole according to a modified example of an information recording system according to an exemplary embodiment.

FIG. 10 is a schematic plan view illustrating a cleaning device 70 according to a modified example. As shown in the drawing, the cleaning device 70 is provided with a cleaning tape assembly 72 in the place of the cleaning tape assembly 28, and is provided with a supporting drive mechanism 74 in place of the supporting drive mechanism 32.

The cleaning tape assembly 72 includes a feed-out roll 34 around which a cleaning tape 30 is wound, a leader pin 76 serving as a leader member on a pin provided to a leading end of the cleaning tape 30, and a holder 80 serving as a retaining member that retains the feed-out roll 34 and the leader pin 76. The holder 80 supports the feed-out roll 34 through a support shaft 34A such that the feed-out roll 34 can rotate freely, and configuration is made such that one end side of the leader pin 76 is retained by fitting together with a fitting together portion 80A.

The supporting drive mechanism 74 includes a drive shaft 78 that functions as a drive unit, and a support shaft 42. The drive shaft 78 is formed with a recess shaped mounting portion 78A to which the leader pin 76 is mounted. The cleaning tape 30 is taken up by the drive shaft 78 rotating with the leader pin 76 mounted to the mounting portion 78A.

In order to set the cleaning tape assembly 72 in the case 12 (supporting drive mechanism 74), firstly the feed-out roll 34 is mounted on the support shaft 42 through an insertion hole 82, then the leader pin 76 is mounted on the mounting portion 78A of the drive shaft 78 while pulling out the cleaning tape 30. Next, the insertion hole 82 is closed by a cover 41. In response to a cleaning request of the magnetic head 20, after the conditions for the magnetic head 20 being positioned in a cleaning position is fulfilled, the drive shaft 78 is driven to rotate, the cleaning tape 30 travels in the arrow A direction, and cleaning of the magnetic head 20 is achieved. In order to take out the cleaning tape assembly 72 after use, for example, the leader pin 76 that is fitted together with the fitting together portion 80A of the holder 80 may be gripped by fingers or a tool and lifted up.

Note that embodiments are not limited to the exemplary embodiment described above, in which the magnetic head 20 is switched between the in-use position and the cleaning position only by an up and down direction movement. For example, configuration may be made in which the cleaning position is reached by moving the magnetic head 20 in the cleaning tape 30 thickness direction (in the arrow B direction) after moving the magnetic head 20 upwards from the in-use position. In this configuration, the cleaning tape 30 can be made to contact the magnetic head 20 without being affected by change to the travel path of the cleaning tape 30 that depends on the amount of the cleaning tape 30 that has been fed out from the feed-out roll 34. Rubbing between the cleaning tape 30 and the magnetic head 20 accompanying the movement between the cleaning position and the in-use position can also be prevented.

Moreover, embodiments are not limited to the exemplary embodiment described above, in which the cleaning tape 30 cleans the magnetic head 20 while moving in the arrow A direction. For example, configuration may be made in which the cleaning tape 30 cleans the magnetic head 20 while moving back and forth, in the arrow A direction and the direction opposite to the arrow A direction.

Moreover, embodiments are not limited to the exemplary embodiment described above, in which the cleaning device 22 is disposed at an upper side that is one width direction side of the recording tape T with respect to the magnetic head 20. For example, configuration may be made in which the cleaning device 22 is disposed overlapping with the recording tape T in the height direction. Namely, in the present invention, any configuration may be adopted as long as movement of the magnetic head 20 from the in-use position to the cleaning position is independent of the cleaning operation of the magnetic head 20 by the cleaning device 22 (as long as the operation directions are different).

Embodiments are not limited to the exemplary embodiment described above, in which the cleaning tape assembly 28 that serves as a cleaning member is configured including the cleaning tape 30. For example, the cleaning member may be configured including a cleaning pad.

Moreover, embodiments are not limited to the exemplary embodiment described above, in which the cleaning tape assembly 28, 72, serving as the cleaning member is replaceable. For example, the cleaning device 22 may be configured with a non-replaceable cleaning member.

What it claimed is:

1. An information recording system, comprising:
a case;
a head provided inside the case;
a recording tape that travels inside the case due to rotation of a pair of reels that are provided inside the case, with at least one of information writing or information reading performed to or from the recording tape by the head while the recording tape is in contact with the head;
a drive mechanism that drives the head between an in-use position contacting the recording tape and a cleaning position separated from the in-use position; and
a cleaning device that is provided inside the case, and that cleans the head when positioned in the cleaning position by rubbing against the head in a direction different from a direction of movement of the head from the in-use position to the cleaning position.

2. The information recording system of claim 1, wherein:
the cleaning device is disposed on one width direction side of the recording tape with respect to the head that is positioned in the in-use position; and
the cleaning device cleans the head by rubbing against the head in a direction along a travel direction of the recording tape.

3. The information recording system of claim 1, further comprising a separating mechanism that separates the head from the recording tape in a thickness direction of the recording tape before driving the head between the in-use position and the cleaning position.

4. The information recording system of claim 1, further comprising a retention unit that retains the head in the cleaning position except in cases in which at least one of information writing or information reading is being performed to or from the recording tape by the head.

5. The information recording system of claim 1, wherein:
the cleaning device comprises a cleaning member, and a drive unit that moves the cleaning member along a travel path of the recording tape in a state in which the cleaning member is in contact with the head; and
the cleaning member is replaceable from outside of the case due to the cleaning member being detachably mounted to the drive unit.

6. The information recording system of claim 5, wherein:
the cleaning member comprises a cleaning tape, a pair of winding shafts that take up and feed out the cleaning tape, and a retaining member that retains the pair of winding shafts; and
the drive unit of the cleaning device is provided at the case and drives one of the winding shafts, and the cleaning device further comprises a support shaft that rotatably supports the other of the winding shafts.

7. The information recording system of claim 5, wherein:
the cleaning member comprises a cleaning tape, a winding shaft that takes up and feeds out the cleaning tape, a leader member provided at a leading end of the cleaning tape, and a retaining member that retains the winding shaft and the leader member;
the cleaning device comprises a support shaft that is provided at the case and rotatably supports the winding shaft; and
the drive unit of the cleaning device rotates a drive shaft at which the leader member is mounted.

8. A magazine, comprising:
a pair of reels to which a common recording tape is coupled so as to be capable of being taken up and fed out;
a cleaning member that cleans a head that is provided at an information recording system and performs at least one out of information writing or information reading to or from the recording tape while the recording tape is in contact with the head;
an upper cartridge that retains the pair of reels and the cleaning member at predetermined positions so that the pair of reels and the cleaning member are transferred to the information recording system at the predetermined positions; and
a lower cartridge that is detachably mounted at the upper cartridge, and that houses the pair of reels and the cleaning member between the lower cartridge and the upper cartridge.

* * * * *